(No Model.)

D. B. CRAW.
MAGAZINE CAMERA.

No. 543,439. Patented July 23, 1895.

WITNESSES
Severance,
N. S. Hockman.

INVENTOR
David B. Craw
by his Atty
Mason Fenwick Lawrence

UNITED STATES PATENT OFFICE.

DAVID B. CRAW, OF OSHKOSH, WISCONSIN, ASSIGNOR OF ONE-HALF TO EVERETT G. TULLEDGE, OF SAME PLACE.

MAGAZINE-CAMERA.

SPECIFICATION forming part of Letters Patent No. 543,439, dated July 23, 1895.

Application filed February 5, 1895. Serial No. 537,358. (No model.)

*To all whom it may concern:*

Be it known that I, DAVID B. CRAW, a citizen of the United States, residing at Oshkosh, in the county of Winnebago and State of Wisconsin, have invented certain new and useful Improvements in Magazine Photographic Cameras; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to magazine-cameras where dry-plates or separated films are employed, and the object of my invention is to provide a simple and effective means for changing the plates or films from the magazine to the camera proper and back to the magazine.

The invention consists of the combination of a camera proper, a plate-magazine, a plate-changer connected to the camera and adapted to receive any one of the plates from the magazine and deposit it in the camera, and vice versa, and means for locating and stopping the plate-changer exactly over the plate in the magazine it is desired to use.

It also consists of the combination of a camera proper, a plate-magazine, a pivoted sliding plate-changer adapted to receive any one of the plates from the magazine and deposit it in the camera, and vice versa; means for stopping the plate-changer exactly over the plate it is desired to remove from the magazine, and an indicator to show which plate is used.

It also consists of certain other novel constructions, combinations, and arrangements of parts, all of which will be hereinafter more particularly set forth and claimed.

Figure 1:
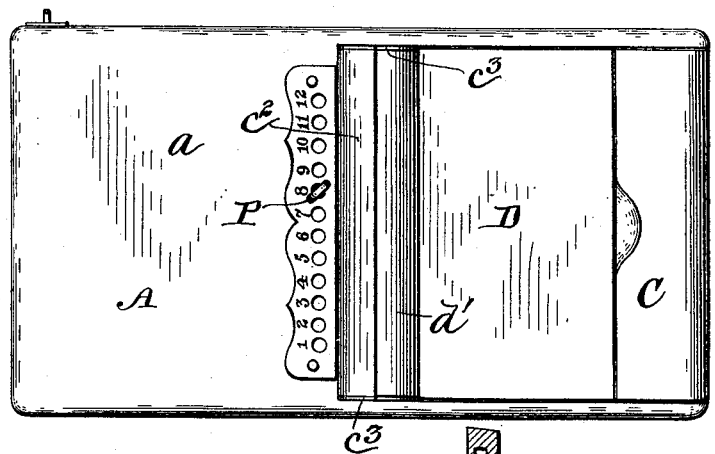
Figure 2:
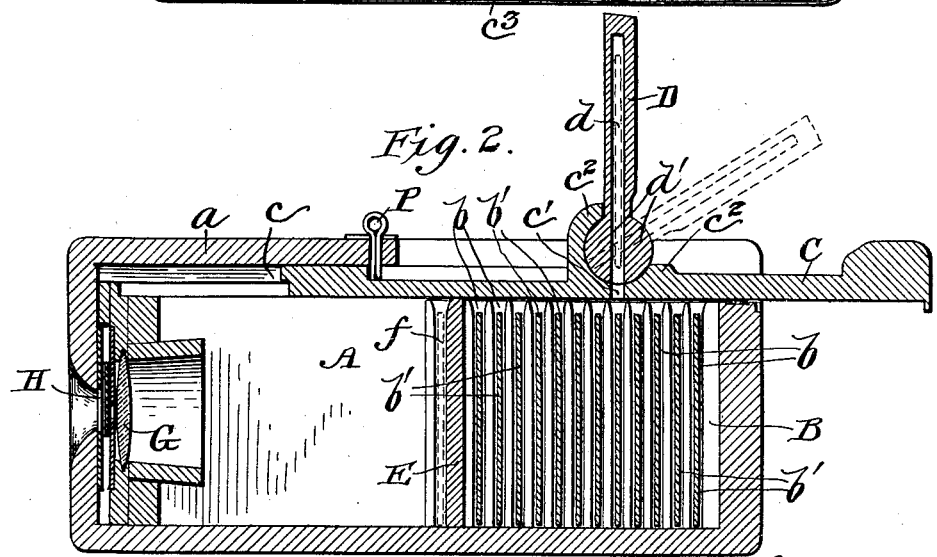
Figure 3:
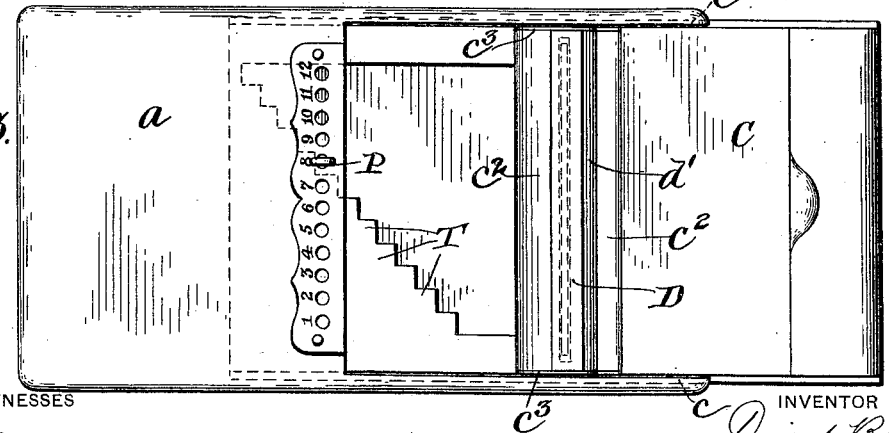

In the accompanying drawings, Figure 1 is a top view of the camera with the cover closed. Fig. 2 is a central vertical longitudinal section of the camera, and Fig. 3 is a top view with cover partly open.

Similar letters and numerals refer to similar parts in each view.

A in the drawings represents an inclosing-box, and B a magazine portion provided with vertically-grooved side walls $b$ for the reception of plates $b'$ $b'$ $b'$, &c. C is a cover sliding in the grooves or ways $c$ $c$ in the top of the case A. D is a plate-changer pivoted to the sliding cover C, and provided with an internal plate-receiving slot or chamber $d$, which is adapted to register with a slot $c'$ in said cover C, and thus provide a communication with the interior of the camera. This plate-changer is provided at its lower edge, on each side, with a rounded bead $d'$. The bead on the forward side of the changer is confined beneath an overhanging flange or block $c^2$, and that on the rear side bears against another flange $c^2$, plates $c^3$ connecting said flanges at the ends.

The foregoing construction permits the plate-changer to move through a quarter of a circle in one direction, and thus it can either be turned down flat on the cover C or raised at right angles thereto, in which latter position the slot $d$ registers with the slot $c'$ and a plate can be slid in or out of the changer.

E is a dividing partition between the magazine and the camera proper, and $f$ $f$ are the vertical grooves for receiving the plate to be exposed in the camera.

The portion $a$ of the top of the case A in front of the plate-changer D is immovable, the cover $c$ sliding beneath it, so as to effectually prevent the entrance of light. This portion $a$ is pierced with twelve holes, 1, 2, 3, &c., consecutively numbered to correspond with the plate-numbers in the magazine. P is a pin which may be passed through any of these holes to engage, when the cover is pulled, a corresponding notch in a graduated plate T, which is attached to the upper side of the cover C and slides therewith.

Any suitable shutter H is provided in front of the lens G.

In the operation of the camera, to move a plate from the magazine to the grooves $f$ $f$ in front of the partition E, I first insert the pin P into the hole in the top $a$ corresponding with the number of the plate in the magazine which it is intended to use. Then I pull the sliding cover out as far as possible. The pin P will engage the proper step in the graduated plate T, and prevent the cover from sliding farther. I then raise the plate-changer D to its vertical position, (see Fig. 2,) and the slot $d$ will be directly over the desired plate in the magazine. By tipping the box bottom side up the plate will drop into the slot $d$. I then tip the plate-changer back to its horizontal position, reverse the box and slide the cover forward until it strikes against the top $a$ and raise the plate-changer again to its vertical position, when the plate will drop into the vertical grooves $f f$. After the exposure is made the plate can be carried back to its place in the magazine by the reverse process. The film sides of the plates are turned forward in the magazine, so that a correct exposure will be made when they are transferred to the camera proper. All the internal parts of both the camera and the magazine are coated with lampblack, so as to give a dead-black finish that will not reflect any rays of light and cause halation spots on the exposed plate, where they should not be.

What I claim as my invention, and desire to secure by Letters Patent, is—

1. In a magazine camera the combination of a camera proper, a plate magazine in the rear of the same, a pivoted sliding plate changer adapted to receive any plate from the magazine and deposit it in the camera or vice versa, a graduated stop slide and means for positively engaging said slide to stop the plate changer exactly over the plate it is desired to use, substantially as described.

2. In a magazine camera, the combination of a camera proper, a plate magazine in the rear of the same, a pivotal sliding plate changer adapted to receive any plate from the magazine and deposit it in the camera or vice versa, a graduated slide, an apertured indicator, and a pin adapted to be passed through any one of the apertures of said indicator and engage the graduated slide to stop the plate changer over the desired plate in the magazine, substantially as described.

In testimony whereof I affix my signature in presence of two witnesses.

DAVID B. CRAW.

Witnesses:
CHARLES J. SCHMITT,
HENRY HENKEL.